United States Patent
Yoshie et al.

(10) Patent No.: US 6,851,700 B2
(45) Date of Patent: Feb. 8, 2005

(54) STROLLER WITH A RECLINING MECHANISM

(75) Inventors: Toshiro Yoshie, Tokyo-To (JP); Yutaka Ukitsu, Tokyo-To (JP); Tokihiko Ikuno, Tokyo-To (JP)

(73) Assignee: Combi Corporation, Tokyo-To (JP)

( * ) Notice: Subject to any disclaimer, the term of this patent is extended or adjusted under 35 U.S.C. 154(b) by 52 days.

(21) Appl. No.: 10/341,348

(22) Filed: Jan. 14, 2003

(65) Prior Publication Data

US 2003/0132611 A1 Jul. 17, 2003

(30) Foreign Application Priority Data

Jan. 15, 2002 (JP) .................................. 2002-005828

(51) Int. Cl.[7] ................................................ B42B 7/00
(52) U.S. Cl. ..................... 280/642; 280/647; 280/658
(58) Field of Search ....................... 280/639, 642, 280/647, 648, 650, 657, 658, 47.38, 47.4; 297/DIG. 4

(56) References Cited

U.S. PATENT DOCUMENTS

| | | | | |
|---|---|---|---|---|
| 3,689,099 A | * | 9/1972 | Patterson | 280/38 |
| 4,378,946 A | * | 4/1983 | Voytko et al. | 280/642 |
| 4,435,012 A | * | 3/1984 | Kassai | 297/354.12 |
| 4,478,427 A | * | 10/1984 | Hyde et al. | 280/642 |
| 4,538,830 A | * | 9/1985 | Nakao et al. | 280/647 |
| 4,632,421 A | * | 12/1986 | Shamie | 280/642 |
| 4,741,551 A | * | 5/1988 | Perego | 280/642 |
| 4,805,928 A | * | 2/1989 | Nakao et al. | 280/642 |
| 4,832,361 A | * | 5/1989 | Nakao et al. | 280/642 |
| 4,892,327 A | * | 1/1990 | Cabagnero | 280/650 |
| 5,087,066 A | * | 2/1992 | Mong-Hsing | 280/644 |
| 5,195,770 A | * | 3/1993 | Ishikura | 280/648 |
| 5,333,887 A | * | 8/1994 | Luther | 280/250.1 |
| D356,528 S | * | 3/1995 | Liu | D12/129 |
| 5,421,603 A | * | 6/1995 | Wills et al. | 280/642 |
| 5,722,682 A | * | 3/1998 | Wang | 280/642 |
| 5,752,738 A | * | 5/1998 | Onishi et al. | 297/61 |
| 5,772,235 A | * | 6/1998 | Espenshade | 280/643 |
| 5,833,261 A | * | 11/1998 | Brown et al. | 280/642 |
| 6,203,054 B1 | * | 3/2001 | Matsumoto | 280/647 |
| 6,273,451 B1 | * | 8/2001 | Julien et al. | 280/642 |
| 6,530,591 B2 | * | 3/2003 | Huang | 280/650 |

* cited by examiner

*Primary Examiner*—Christopher P. Ellis
*Assistant Examiner*—Kelly E Campbell
(74) *Attorney, Agent, or Firm*—Wenderoth, Lind & Ponack, L.L.P.

(57) ABSTRACT

A stroller is provided with a seat back capable of being reclined by a reclining mechanism. The stroller includes a handle, and a seat back having a pipe frame pivotally supported on the handle and having the shape of an inverted letter U. The handle is provided with a plurality of stopping steps, and retaining members capable of being engaged with the stopping steps are supported respectively in end parts of the pipe frame so as to be advanced and retracted. The pipe frame has a horizontal upper part, and an unlocking device for pulling up the retaining member, to disengage the same from the stopping steps, is held on the horizontal upper part.

18 Claims, 6 Drawing Sheets

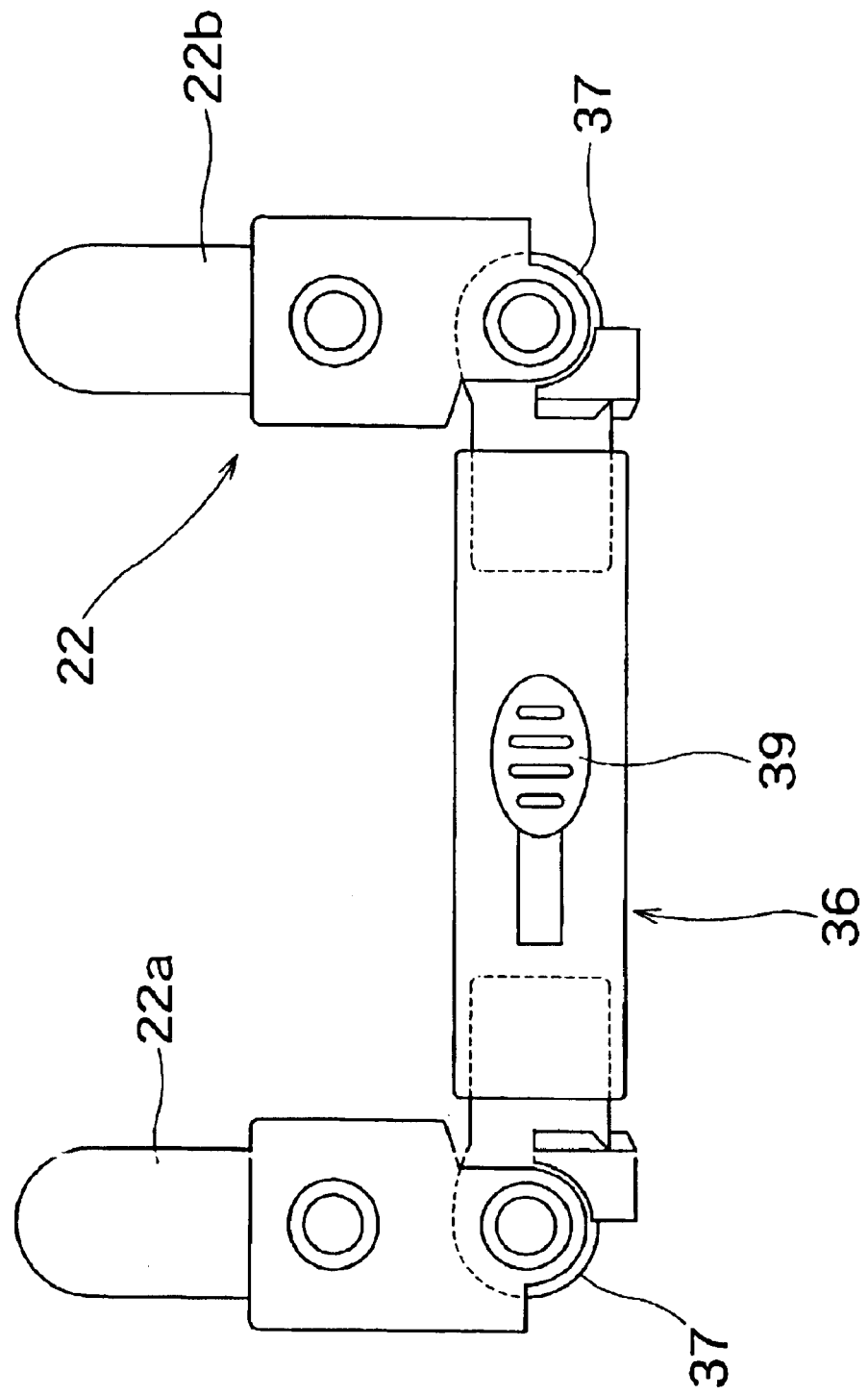

STROLLER WITH A RECLINING MECHANISM

TECHNICAL FIELD

The present invention relates to a stroller with a reclining mechanism capable of selectively changing an inclination of a seat back.

BACKGROUND ART

There have been proposed various strollers capable of being folded in three when necessary, for carrying a baby outdoors for walking or shopping. Such a stroller is folded in three by pulling front and back structures of a body toward each other to reduce a dimension of the stroller from the front to the back, and turning side parts of the body toward each other on hinges at two parts to reduce a transverse dimension of the stroller. Some of these previously proposed strollers are provided with a reclining seat back that can be set at a desired inclination to support a baby in a lying position or a sitting position.

Generally, inclination of a seat back of a stroller, provided with a reclining mechanism for changing the inclination of the seat back, is changed by operating retaining devices disposed on opposite sides of the seat back to unlock the seat back, and turning the seat back to a desired inclination or lifting a frame of the seat back. Therefore, the retaining devices must be operated or the frame of the seat back must be lifted by using both hands. Thus, it is troublesome and difficult for a user holding a baby to adjust the inclination of the seat back, and the user needs to exert physical strength.

SUMMARY OF THE INVENTION

The present invention has been made in view of such circumstances and it is therefore an object of the present invention to provide a stroller with a reclining mechanism that can be operated by a single hand of a person holding a baby to adjust inclination of a seat back.

According to the present invention, a stroller with a reclining mechanism comprises: a handle including a pair of side pipes; a seat back having a pipe frame pivotally supported on the side pipes of the handle; retaining members supported respectively in end parts of the pipe frame so as to be advanced and retracted; and a plurality of stopping steps formed on a side of the handle, and capable of being selectively engaged with the retaining members supported in the pipe frame.

In the stroller with the reclining mechanism according to the present invention, the pipe frame is formed in a shape resembling an inverted letter U, and has a pair of straight side parts and a horizontal upper part connected to the pair of straight side parts; and an unlocking device for pulling up the retaining members to disengage the retaining members from the stopping steps is provided on the horizontal upper part.

In the stroller with the reclining mechanism according to the present invention, pipe frame retaining members are fixed to inner side surfaces of the pair of side pipes of the handle to pivotally support corresponding straight side parts of the pipe frame.

In the stroller with the reclining mechanism according to the present invention, each pipe frame retaining member has a curved inner surface having the shape of a circular arc, and the plurality of stopping steps with which the retaining member engages are formed in the curved inner surface.

In the stroller with the reclining mechanism according to the present invention, the retaining members of the pipe frame are urged in a projecting direction, and are connected to the unlocking device by wires, respectively.

In the stroller with the reclining mechanism according to the present invention, the stroller is capable of being folded in three, the handle is provided with hinges at two positions thereon, the pipe frame is provided with hinges at two positions thereon, and the handle and the pipe frame can be folded in three.

In the stroller with the reclining mechanism according to the present invention, the retaining members of the pipe frame are urged in the projecting direction by springs placed inside the pipe frame, respectively.

In the stroller with the reclining mechanism according to the present invention, the retaining members are formed in an elongate shape and are provided with longitudinal slots, respectively, and the pipe frame is provided with pins respectively engaged in the slots.

In the stroller with the reclining mechanism according to the present invention, adjacent stopping steps are connected by flat surfaces.

In the stroller with the reclining mechanism according to the present invention, the stopping steps are arranged at equal intervals.

BRIEF DESCRIPTION OF THE DRAWINGS

FIG. 6 is a plan view of the pipe frame in a folded state.

DETAILED DESCRIPTION OF THE PREFERRED EMBODIMENTS

Figure 1:
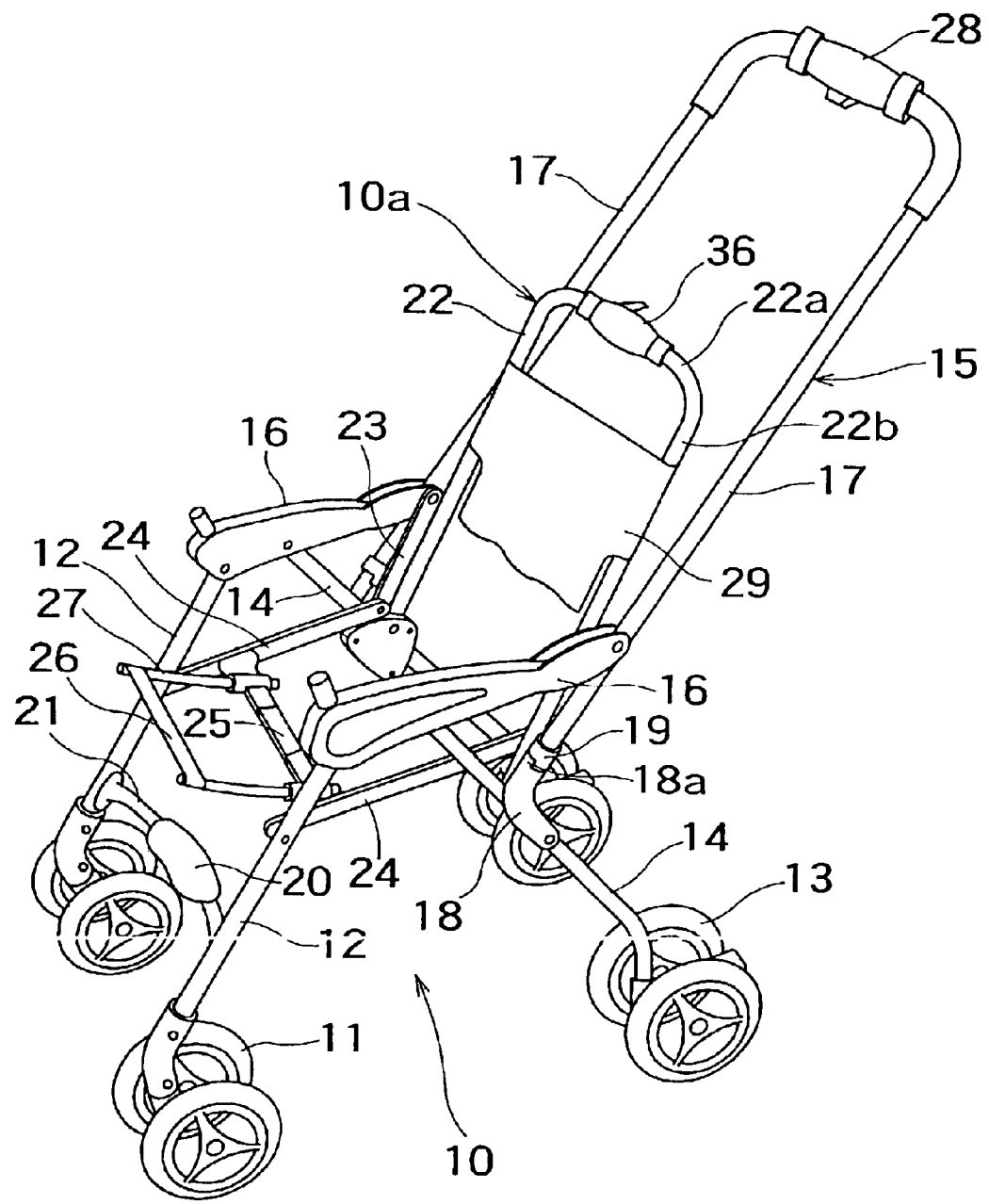
FIG. 1 is a schematic perspective view of a stroller in a preferred embodiment according to the present invention.

FIG. 1 is a schematic perspective view of a stroller 10 with a reclining mechanism in a preferred embodiment according to the present invention. The stroller 10 has a pair of front legs 12 respectively provided with front dual wheel units 11, a pair of rear legs 14 respectively provided with rear dual wheel units 13, a handle 15 having the shape of an inverted letter U, and a pair of armrests 16.

The handle 15 has a pair of side pipes 17. The ends of the armrests 16 are joined pivotally to lower end parts of the side pipes 17, respectively. Upper ends of the front legs 12 are joined pivotally to front end parts of the armrests 16, respectively.

Upper ends of the rear legs 14 are joined pivotally to middle parts of the armrests 16, respectively. Lower ends of substantially L-shaped brackets 18 are joined pivotally to middle parts of the rear legs 14, respectively. Lower ends of the side pipes 17 of the handle 15 are joined pivotally to middle parts of the brackets 18, respectively. When the stroller 10 is unfolded, locking members 19 mounted on lower end parts of the side pipes 17 are engaged with upper stopping parts 18a of the brackets 18 to maintain the stroller in an unfolded state.

The right and the left front legs 12 are connected by a front connecting bar 21 provided with a footrest 20, and the rear legs 14 are connected by a rear connecting bar, not shown. Pipe frame retaining members 23 for retaining a pipe frame 22, included in a seat back 10a, at a desired inclination are fixed to opposite inner side surfaces of lower end parts of the side pipes 17, respectively. The brackets 18 and right and left connecting bars 24 are joined pivotally to the pipe frame retaining members 23. Front ends of the connecting bars 24 are joined pivotally to middle parts of the front legs 12. An upper connecting bar 25 has opposite ends connected to middle parts of the right and left connecting bars 24, respectively. Two support rods 27 project forwardly from the upper connecting bar 25, and a seat support member 26 is connected to front ends of the support rods 27.

As shown in FIG. 1, the stroller 10 is held in an unfolded state for use by engaging the locking members 19, mounted on the lower ends of the side pipes 17, with the stopping parts 18a formed in the upper ends of the brackets 18. The locking members 19 are disengaged from the brackets 18 by operating an operating device 28 mounted on the handle 15. Then, the armrests 16 and the connecting bars 24 can be turned upwardly on pivotal joints on the side pipes 17 and the pipe frame retaining members 23. Thus, the front legs 12 and the rear legs 14 are turned toward each other so as to extend substantially parallel with each other, and the stroller 10 can be folded to facilitate carrying the same.

Figure 2:
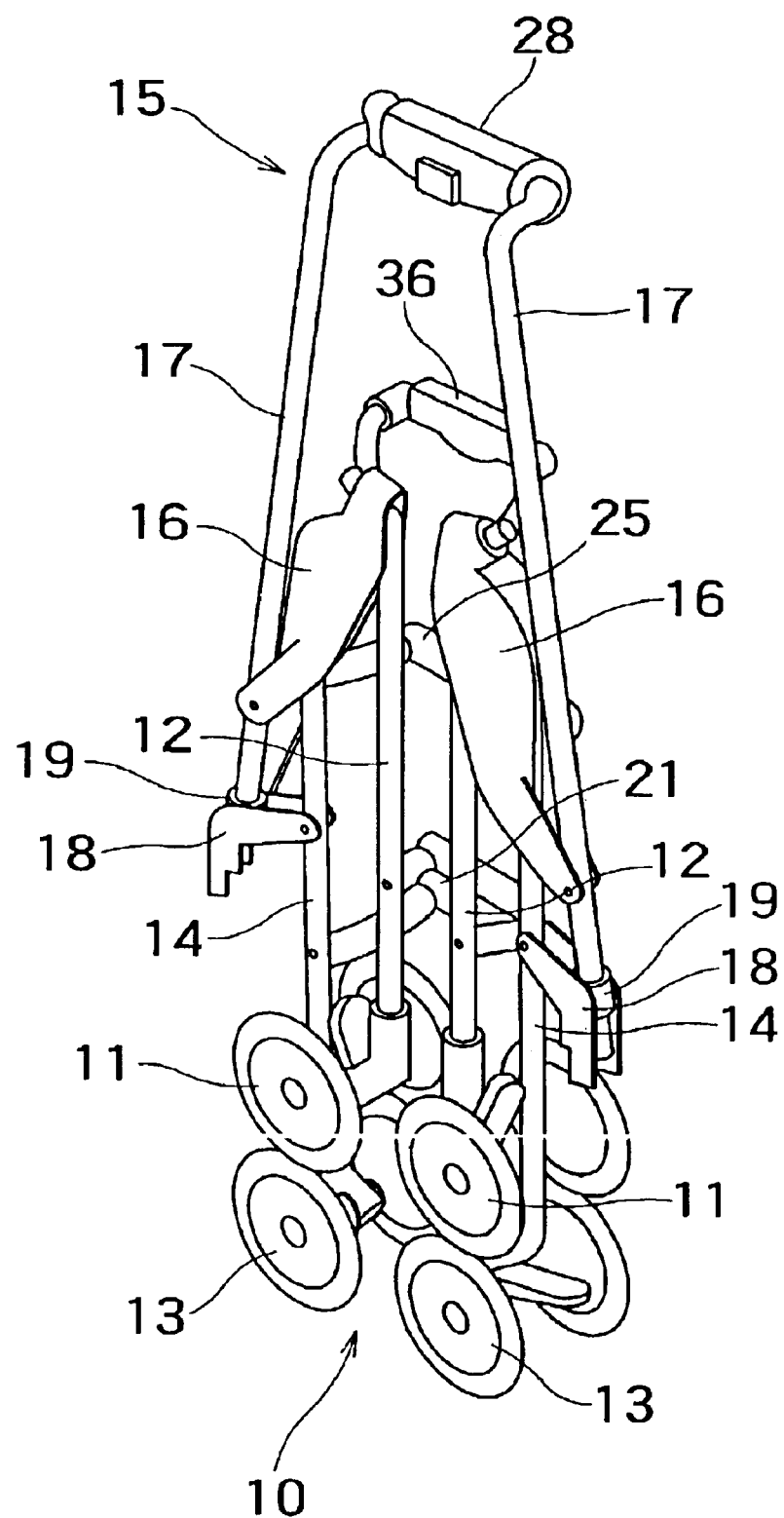
FIG. 2 is a perspective view of the stroller in a folded state.

The handle 15, the front connecting bar 21, the rear connecting bar and the upper connecting bar 25 are provided with pairs of joints included in the same two vertical planes, respectively. Therefore, respective opposite side parts of the handle 15, the front connecting bar 21, the rear connecting bar and the upper connecting bar 25 can be bent so as to extend forwardly and the handle 15, the front connecting bar 21, the rear connecting bar and the upper connecting bar 25 can be folded into a U-shape by turning the side pipes 17 forwardly after turning the front legs 12 and the rear legs 14 so as to extend parallel with each other. Thus, the stroller 10 can be further compactly folded in three as shown in FIG. 2.

Figure 3:
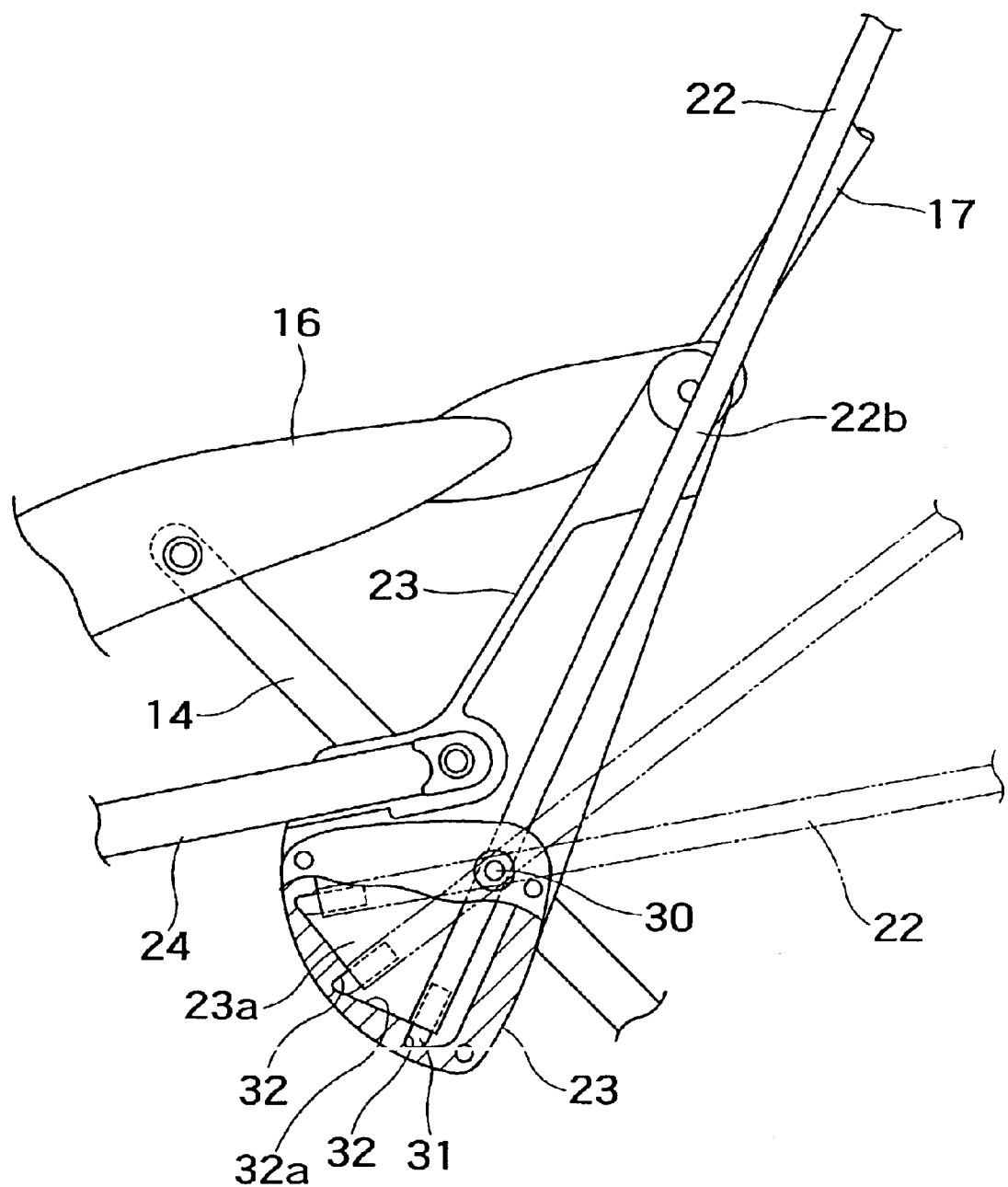
FIG. 3 is an enlarged view of a mechanism for supporting a seat back on a body structure of the stroller.

The pipe frame 22 included in the seat back 10a is supported on the pipe frame retaining members 23 fixed to the side pipes 17 of the handle 15. The pipe frame 22 is formed by bending a pipe into a shape resembling an inverted letter U. The pipe frame has a pair of straight side parts 22b, and a horizontal upper part 22a extended between the pair of straight side parts 22b. A backrest 29 (only a part of the backrest 29 is shown in FIG. 1) is extended between the straight side parts 22b. FIG. 3 is an enlarged view of a pipe frame retaining mechanism for retaining the pipe frame 22 of the seat back 10a at a desired inclination. A lower end part of each straight side part of the pipe frame 22 is inserted into a space formed in a lower part of the pipe frame retaining member 23. The lower end part of each straight side part 22b is pivotally supported by a pin 30 on the pipe frame retaining member 23.

Figures 4A, 4B:
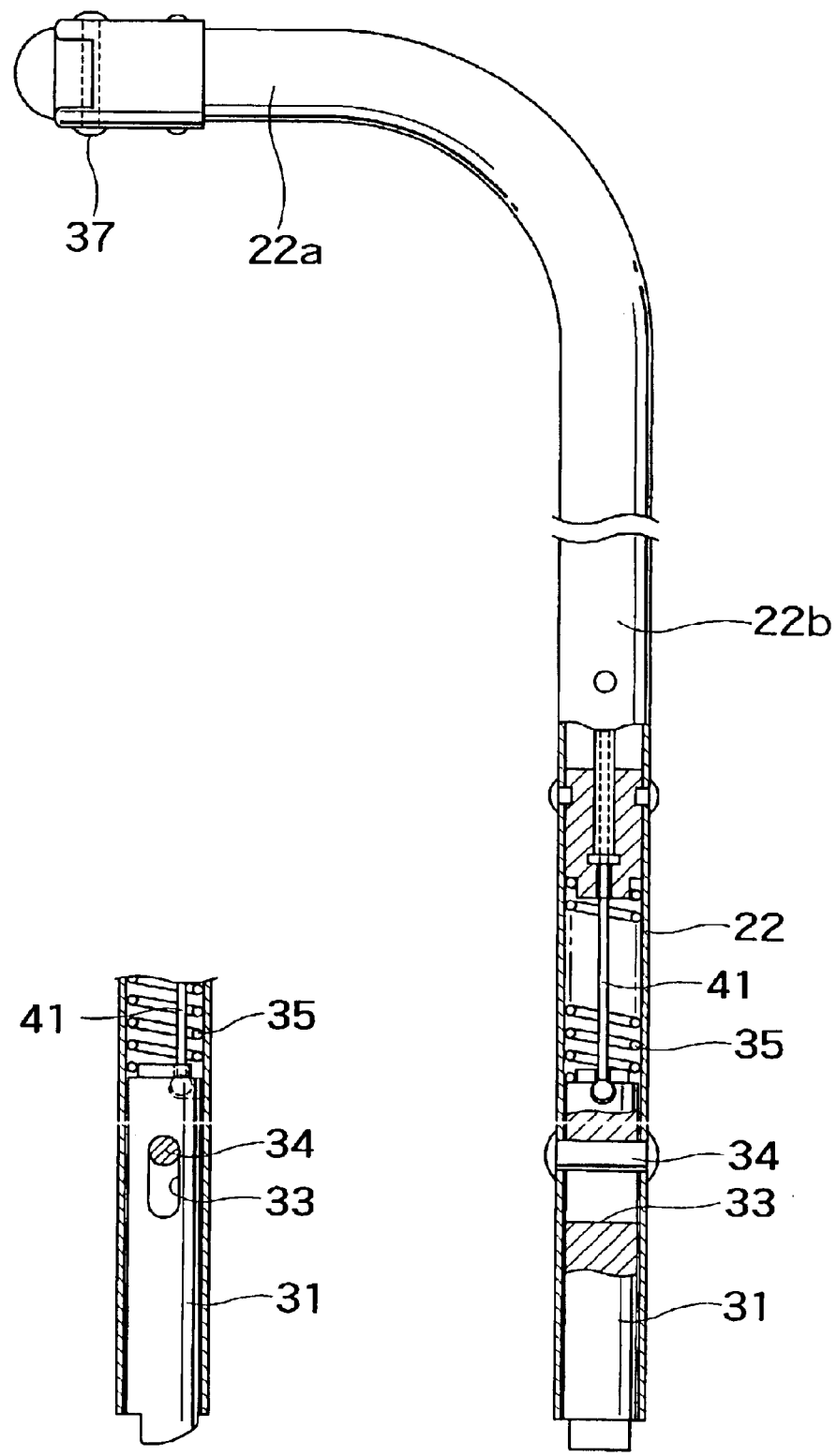
FIG. 4A is a partly sectional front elevational view of a retaining member support mechanism for supporting a retaining member of a pipe frame.
FIG. 4B is a sectional view of the retaining member support mechanism.

An elongate retaining member 31 is inserted axially slidably into the lower end part of each straight side part 22b of the pipe frame 22. A plurality of stopping steps 32 are formed in an inner end surface of the pipe frame retaining member 23 opposite to the lower end of each straight side part 22b of the pipe frame 22. The retaining member 31 is engaged selectively with one of the plurality of stopping steps 32. Flat surfaces 32a extend between adjacent stopping steps 32. The stopping steps 32 are arranged at equal intervals. As shown in FIGS. 4A and 4B, the retaining member 31 is provided with a longitudinal slot 33. A pin 34 extending across the straight side part 22b of the pipe frame 22 extends through the slot 33. Thus, the retaining member 31 is fitted axially slidably in the lower end part of the straight side part 22b of the pipe frame 22. The retaining member 31 can be projected from and retracted into the straight side part 22b of the pipe frame 22. A spring 35 pushes the retaining member 31 in a direction to project the retaining member 31 from the lower end of the straight side part 22b.

The pipe frame 22, the pipe frame retaining member 23, and the retaining member 31 compose a reclining mechanism.

Figure 5:
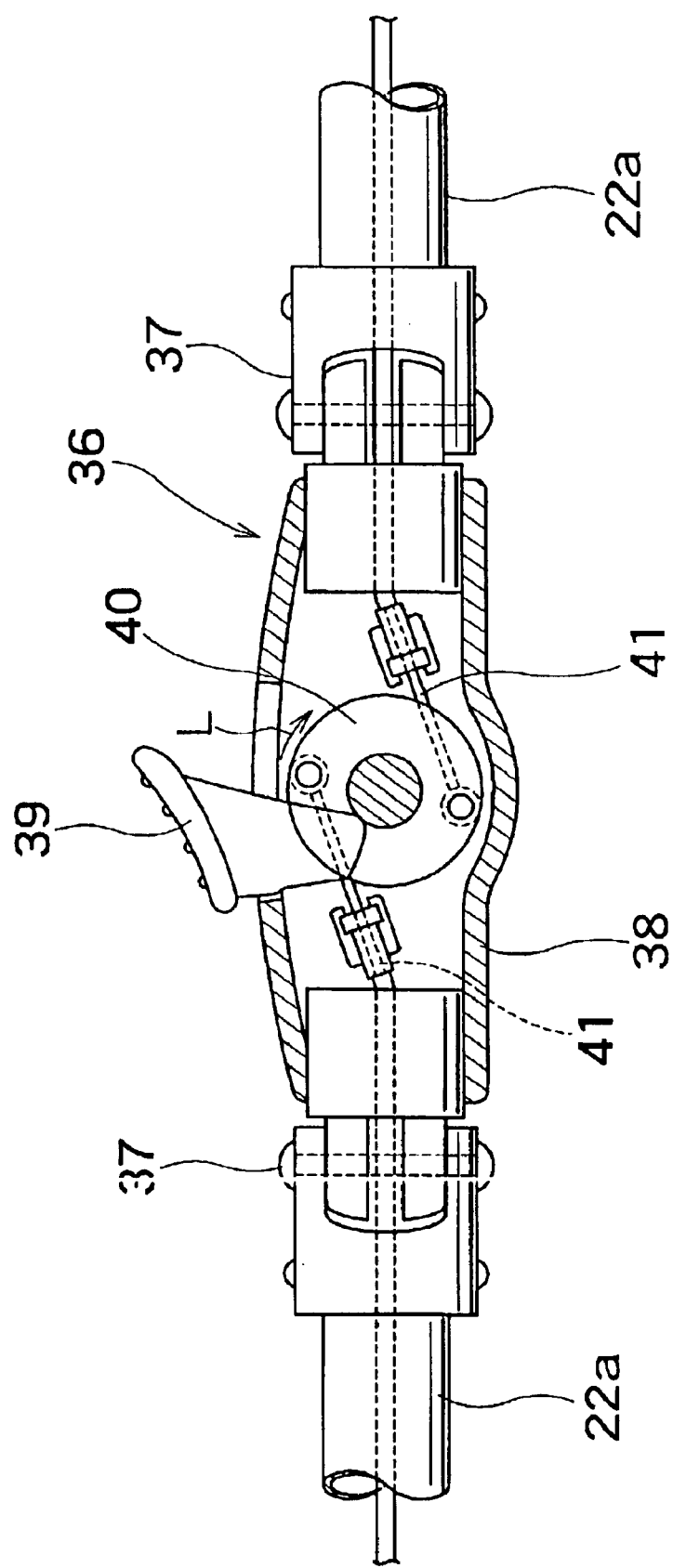
FIG. 5 is a sectional plan view of an unlocking mechanism.

As shown in FIG. 1, an unlocking device 36 for disengaging the retaining member 31 from a stopping step 32 of the pipe frame retaining member 23 is supported on the horizontal upper part 22a of the pipe frame 22. As shown in FIG. 5, opposite ends of the unlocking device 36 are connected to parts of the horizontal upper part 22a composing the shape of an inverted letter L by hinges 37, respectively, to form the pipe frame 22 having a shape generally resembling the inverted letter U. A disk 40 is placed in and supported for turning on a housing 38 included in the unlocking device 36 so as to be turned by operating a lever 39. Ends of wires 41 are connected to pins attached to diametrically opposite parts of the disk 40, respectively. The other ends of the wires 41 are connected to the retaining members 31, respectively.

The lever 39 is operated to turn the disk 40 in the direction of arrow L indicated in FIG. 5. Consequently, the wires 41 are pulled, the retaining members 31 are raised against resilience of springs 35 to disengage the retaining members 31 from the stopping steps 32, and thereby the seat back 10a becomes turnable. Then, the pipe frame 22 of the seat back 10a can be turned upwardly or downwardly for inclination adjustment to set the seat back 10a in a desired position. The pipe frame 22 of the seat back 10a can be turned in a desired direction, for example, in a direction from a position indicated by continuous lines to a position indicated by chain lines shown in FIG. 3, or in an opposite direction.

In folding the stroller in three, the side parts of the pipe frame 22 can be turned on the hinges 37 to fold the pipe frame 22 into a U-shape in a plan view as shown in FIG. 6 so that the pipe frame 22 can be folded when folding the stroller. Thus, the stroller can easily be folded as shown in FIG. 2.

Thus, the seat back of the stroller can be folded in three, and be reclined by operating the unlocking device 36 incorporated into the pipe frame 22. The unlocking device 36 can easily be operated by one hand with the other hand holding a baby.

As is apparent from the foregoing description, according to the present invention, a pipe frame having the shape of an inverted letter U and included in a seat back is pivotally joined to a body structure of a stroller. Retaining members each capable of being selectively engaged with one of a plurality of stopping steps formed in the body structure are axially slidably fitted in end parts of the pipe frame, and an unlocking device for disengaging the retaining members from the stopping steps by pulling the retaining members is incorporated on a horizontal upper part of the pipe frame. Thus, the seat back can be turned for a reclining operation by operating the unlocking device of the pipe frame, and the unlocking device can easily be operated by one hand with the other hand holding a baby. Since the pipe frame is foldable similarly to a handle of the stroller, the seat back can be applied to strollers foldable in three as stated above.

What is claimed is:

1. A stroller with a reclining mechanism, said stroller comprising:
   a handle including side pipes;
   a seat back having a pipe frame pivotally supported on said side pipes of said handle, said pipe frame having straight side parts;
   retaining members supported respectively in end parts of said pipe-frame so as to be advanced and retracted;
   a plurality of stopping steps formed on sides of said handle, respectively, and capable of being selectively engaged with the said retaining members, respectively; and
   pipe frame retaining members fixed to inner side surfaces of said side pipes of said handle respectively, to pivotally support a corresponding one of said straight side parts of said pipe frame.

2. The stroller with a reclining mechanism according to claim 1, wherein
   said pipe frame has a shape resembling the an inverted letter U defined by a horizontal upper part being connected said straight side parts; and further comprising:
   an unlocking device, on said horizontal upper part, for pulling said retaining members upwardly to disengage said retaining members from a corresponding one of each said plurality of stopping steps.

3. The stroller with a reclining mechanism according to claim 2, wherein
   said retaining members are urged in a projecting direction, and are connected to said unlocking device by wires, respectively.

4. The stroller with a reclining mechanism according to claim 3, wherein
   said retaining members are urged in the projecting direction by springs, respectively, placed inside said pipe frame.

5. The stroller with a reclining mechanism according to claim a 1, wherein
   each of said pipe frame retaining members has a curved inner surface having a shape of a circular arc, and a each said plurality of stopping steps is formed in a respective said curved inner surface.

6. The stroller with a reclining mechanism according to claim 5, wherein
   adjacent ones of said stopping steps of each said plurality of stopping steps are connected by flat surfaces.

7. The stroller with a reclining mechanism according to claim 6, wherein
   said stopping steps of each said plurality of stopping steps are arranged at equal intervals.

8. The stroller with a reclining mechanism according to claim 1, wherein
   the stroller is capable of being folded in three, and
   said handle is provided with hinges at two positions thereon and said pipe frame is provided with hinges at two positions thereon, such that said handle and said pipe frame can be folded in three.

9. The stroller with a reclining mechanism according to claim 1, wherein
   said retaining members have an elongate shape and are provided with longitudinal slots, respectively, and said pipe frame is provided with pins respectively engaged in said slots.

10. A stroller with a reclining mechanism, said stroller comprising:
    a handle including side pipes;
    a seat back having a pipe frame pivotally supported on said side pipes of said handle, said pipe frame having straight side parts interconnected by a horizontal upper part so as to resemble an inverted letter U;
    retaining members supported respectively in end parts of said pipe frame so as to be advanced and retracted;
    a plurality of stopping steps formed on sides of said handle, respectively, and capable of being selectively engaged with said retaining members, respectively; and
    an unlocking device, on said horizontal upper part, for pulling said retaining members upwardly to disengage said retaining members from a corresponding one of each said plurality of stopping steps.

11. The stroller with a reclining mechanism according to claim 10, wherein
    each of said pipe frame retaining members has a curved inner surface having a shape of a circular arc, and each said plurality of stopping steps is formed in a respective said curved inner surface.

12. The stroller with a reclining mechanism according to claim 10, wherein
    said retaining members are urged in a projecting direction, and are connected to said unlocking device by wires, respectively.

13. The stroller with a reclining mechanism according to claim 10, wherein
    the stroller is capable of being folded in three, and
    said handle is provided with hinges at two positions thereon and said pipe frame is provided with hinges at two positions thereon such that said handle and said pipe frame can be folded in three.

14. The stroller with a reclining mechanism according to claim 10, wherein
    said retaining members have an elongate shape and are provided with longitudinal slots, respectively, and said pipe frame is provided with pins respectively engaged in said slots.

15. A stroller with a reclining mechanism, said stroller comprising:
    a handle including side pipes;
    a seat back having a pipe frame pivotally supported on said side pipes of said handle;
    retaining members supported respectively in end parts of said pipe frame so as to be advanced and retracted, said retaining members being urged in a projecting direction by springs, respectively, placed inside said pipe frame; and
    a plurality of stopping steps formed on sides of said handle, respectively, and capable of being selectively engaged with said retaining members, respectively.

16. The stroller with a reclining mechanism according to claim 15, wherein
    each said plurality of stopping steps is formed in a respective curved inner surface.

17. The stroller with a reclining mechanism according to claim 15, wherein
    the stroller is capable of being folded in three, and
    said handle is provided with hinges at two positions thereon and said pipe frame is provided with hinges at two positions thereon such that said handle and said pipe frame can be folded in three.

18. The stroller with a reclining mechanism according to claim 15, wherein
    said retaining members have an elongate shape and are provided with longitudinal slots, respectively, and said pipe frame is provided with pins respectively, engaged in said slots.

* * * * *